(12) United States Patent
Schilles et al.

(10) Patent No.: US 10,864,711 B2
(45) Date of Patent: Dec. 15, 2020

(54) LAMINATING DEVICE AND A METHOD FOR LAMINATING A DECOR LAYER ONTO A CARRIER PART

(71) Applicant: Faurecia Innenraum Systeme GmbH, Hagenbach (DE)

(72) Inventors: (Gerhard) Wilfried Schilles, Kandel (DE); Sabine Lindemann, Habichtswald (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 301 days.

(21) Appl. No.: 15/875,527

(22) Filed: Jan. 19, 2018

(65) Prior Publication Data
US 2018/0201004 A1 Jul. 19, 2018

(30) Foreign Application Priority Data

Jan. 19, 2017 (DE) .......................... 10 2017 200 890

(51) Int. Cl.
| | |
|---|---|
| *B32B 37/00* | (2006.01) |
| *B32B 37/10* | (2006.01) |
| *B29C 63/04* | (2006.01) |
| *B32B 7/12* | (2006.01) |
| *B32B 38/18* | (2006.01) |

(Continued)

(52) U.S. Cl.
CPC ........ *B32B 37/0046* (2013.01); *B29C 63/046* (2013.01); *B32B 7/12* (2013.01); *B32B 37/1018* (2013.01); *B29C 53/40* (2013.01); *B29L 2031/302* (2013.01); *B32B 37/1207* (2013.01); *B32B 38/1866* (2013.01); *B32B 2037/1215* (2013.01); *B32B 2451/00* (2013.01); *B32B 2605/003* (2013.01)

(58) Field of Classification Search
CPC ... B32B 37/0046; B32B 7/12; B32B 37/1018; B32B 37/1207; B32B 38/1866; B32B 2037/1215; B32B 2451/00; B32B 2605/003; B29C 63/046; B29C 53/40; B29L 2031/302

See application file for complete search history.

(56) References Cited

U.S. PATENT DOCUMENTS

| | | | |
|---|---|---|---|
| 2005/0211369 A1* | 9/2005 | Aso ..................... | B32B 27/40 156/235 |
| 2016/0031202 A1* | 2/2016 | Stevens .................. | B30B 5/02 156/64 |

FOREIGN PATENT DOCUMENTS

DE    102009054486 A1    6/2011

* cited by examiner

*Primary Examiner* — George R Koch
(74) *Attorney, Agent, or Firm* — Faegre Drinker Biddle & Reath LLP

(57) ABSTRACT

A laminating device and method for laminating a decor layer onto a carrier part includes a lower tool with a support region for receiving the carrier part, an upper tool including a pressing surface for exerting a pressing pressure onto the decor layer which is arranged between an upper side of the carrier part and the pressing surface, and at least one movable slider for edge-folding an overhang of the decor layer around an edge of the carrier part by way of pressing the slider against the overhang of the decor layer. A distance between the lower tool and the pressing surface can be enlarged or reduced. The lower tool includes a first membrane, wherein the arrangement of the first membrane and the slider to one another is such that the first membrane is movable onto the slider, for pressing the slider against the overhang of the decor layer.

7 Claims, 3 Drawing Sheets

(51) Int. Cl.
*B32B 37/12* (2006.01)
*B29L 31/30* (2006.01)
*B29C 53/40* (2006.01)

LAMINATING DEVICE AND A METHOD FOR LAMINATING A DECOR LAYER ONTO A CARRIER PART

CROSS-REFERENCE TO RELATED APPLICATION

This application claims priority to German Patent Application No. 10 2017 200 890.3, filed Jan. 19, 2017, which is herein incorporated by reference in its entirety.

TECHNICAL FIELD

The application relates to a laminating device for laminating a decor layer onto a carrier part, as well as to a method for laminating a decor layer onto a carrier part.

BACKGROUND

Devices for laminating a decor layer onto a carrier part, in particular for manufacturing vehicle interior trim parts are known from the state of the art. DE 10 2009 054 486 A1 shows a typical laminating device which comprises an upper tool and a lower tool and at least one moveable slider. The upper tool has a stationary surface for exerting a pressing pressure onto a decor layer which is arranged between an upper side of the carrier part and the stationary surface. The slider is designed for edge-folding an overhang of the decor layer around an edge of the carrier part by way of pressing the slider against the overhang of the decor layer. The upper and the lower tool are designed in a manner such that a distance between the lower tool and the stationary surface can be enlarged or reduced in size. The carrier part and the decor layer are arranged between the upper tool and the lower tool. The decor layer is pressed by the stationary surface onto the carrier part by way of reducing the distance between the lower tool and this surface. The slider is moved along the closing motion or transversely to this, so that this slider knocks the overhang of the decor layer around the edge of the carrier part and presses it onto a rear side of the carrier part.

The movement of the slider against the overhang of the decor layer exerts a pressure upon the decor layer, so that this decor layer is pressed onto the rear side of the carrier part. Given a movement of the slider by way of actuators, it can however occur that this pressure is not distributed homogeneously over the slider surface and the overhang of the decor layer is not pressed uniformly onto the rear side of the carrier part. This can result in the occurrence of folds in the decor layer and/or in the decor layer not being uniformly bonded onto the rear side of the carrier part. Moreover, local pressure maxima can lead to the imprints in the decor layer. The slider must be moved in different directions, in order to ensure a precise movement and thus optimal pressing of the overhang of the decor layer by the slider. This necessitates precise actuators and a complex construction of the laminating device, which can result in high component costs and manufacturing costs.

SUMMARY

It is an object of the present disclosure to suggest a laminating device for laminating a decor layer onto a carrier part, by way of which the problems of known devices which have been mentioned above are overcome or at least partly reduced. An object of the disclosure is moreover to suggest a corresponding method for laminating a decor layer onto a carrier part. An object of the disclosure is also to suggest a laminating device which is comparatively simple and/or inexpensive to manufacture. It can moreover be an object of the disclosure to suggest a method and a laminating device which permits shortened process times on laminating a decor layer onto a carrier part.

The suggested laminating device for laminating a decor layer onto a carrier part comprises a lower tool, an upper tool and at least one movable slider. Herein, the lower tool has a support region for receiving a carrier part. The upper tool comprises a pressing surface for exerting a pressing pressure onto the decor layer which is arranged between an upper side of the carrier part and the pressing surface. The movable slider serves for edge-folding an overhang of the decor layer around an edge of the carrier part by way of pressing the slider against the overhang of the decor layer, so that the overhang is pressed around the edge of the carrier part onto a lower side of the carrier part. The slider is preferably movable relative to the lower tool, in particular relative to the support region of the lower tool. The upper and lower tool are moreover designed in a manner such that a distance between the lower tool and the pressing surface can be enlarged or reduced. A space between the upper tool and the lower tool can thus be opened and closed, for example by way of a rotatory movement such as a folding-open or a folding-closed of the upper tool and/or the lower tool. The upper and/or lower tool can also be opened and/or closed by a translatory movement. The carrier part can be placed on the support region given an opened upper and lower tool. The decor layer can already be arranged on the carrier part on laying the carrier part onto the support region or be arranged on the carrier part after applying the carrier part onto the support region. Given a reduction of the distance, the pressing surface can be pressed onto the decor layer which is arranged on the upper side of the carrier part, so that the decor layer is pressed onto the upper side of the carrier. The laminating tool can therefore simultaneously carry out a laminating process by way of the decor layer being laminated onto the upper side of the carrier part, and an edge-folding process by way of the overhang of the decor layer being edge-folded around the edge of the carrier part.

The upper and the lower tool can moreover fix the carrier part and/or the decor layer, for example by way of clamping, on reducing the distance between the upper tool and the lower tool. Moreover, in some embodiments one envisages the carrier part being able to be shaped by way of the reduction of the distance between the lower tool and the upper tool, similarly to press forming, for example by way of an upper tool which is shaped complementarily to the lower tool.

The lower tool comprises a first membrane, wherein the arrangement of the first membrane and the slider to one another and their design are such that the first membrane is movable against the slider, for pressing the slider against the overhang of the decor layer. As a rule, the membrane is elastic. In embodiments, the slider is of a rigid material, for example brass, bronze, aluminium or steel. Preferably, not only can the slider be moved by the membrane, but also by a pneumatic, hydraulic or motoric device. In some embodiments, the slider is mounted along a guide rail, so that a slider movement is defined and repeatable. As a rule, the slider has a maximal extension in x-direction of 40 cm, preferably maximal 20 cm. In some embodiments, the slider has a maximum extension in y-direction of 30 cm, preferably maximally 15 cm.

The first membrane can be movable against the slider by way of producing an underpressure. The space between the upper tool and the first membrane can be sealed off, so that an underpressure can be applied. The membrane can press against the slider by way of this, so that this slider presses the overhang of the decor layer onto the rear side of the carrier part. In embodiments, the underpressure is a vacuum. The laminating device thus comprises a vacuum pump which is arranged in the upper or the lower tool and can produce the vacuum in the space which can be sealed off. The laminating device however can also be connected to an external vacuum conduit. It is also possible to press the first membrane against the slider by way of an overpressure. The overpressure could then be accordingly applied at the side of the membrane which is away from the slider. A movement of the membrane against the slider, said movement being generated by an underpressure and/or overpressure is advantageous since a homogeneous pressure distribution over the slider surface and on a laminating side of the carrier part can be ensured. Moreover, the membrane can nestle up against undercuts and other shapes in an adequately flexible manner on account of its elastic characteristics, so that a homogeneous pressure distribution can be ensured almost independently of the slider shape. Moreover, in further regions of the decor layer which are not covered by the slider, the membrane can also push the decor layer onto the carrier part with a homogeneous pressure distribution.

The pressing surface can be a second membrane. This has the advantage that the decor layer which is arranged on the upper side of the carrier part can likewise be pressed onto the upper side of the carrier part amid homogeneous pressure distribution, thus with a uniform surface pressing. Preferably, the decor layer can therefore be simultaneously laminated onto the carrier part and be edge-folded around the edge of the carrier part. The carrier part can also have shapes such as undercuts and unevenesses on the upper side, along which the membrane can laminate the decor layer. The upper tool with a pressing surface in the form of a membrane can herein be used for different carrier part shapes in a flexible manner, without an exchange of the upper tool or of the pressing surface being necessary. The laminating device can serve for manufacturing a vehicle interior trim part. Due to a uniform surface pressing, one can succeed in the decor layer being laminated without imprint locations or creases arising on an upper side of the decor layer which can form the viewed side of the vehicle interior trim part.

In embodiments, a space between the first membrane and the second membrane can be sealed off in a second-tight manner, which can be an airtight manner, so that the second membrane can be pressed against the upper side of the carrier part and the first membrane against the slider, by way of subjecting the space to an underpressure. As a rule, the first membrane is connected to the lower tool in a fluid tight manner and the second membrane is connected to the upper tool in a fluid tight manner for this. In embodiments, the underpressure is a vacuum. A laminating of the decor layer onto the upper side of the carrier part can therefore take place simultaneously with the edge-folding of the overhang around the edge of the carrier part. It is particularly a processing time which can therefore be shortened compared to a method which envisages a method step for laminating and a method step for edge-folding.

In embodiments, the first and/or the second membrane is of an extensible material. Also, in some embodiments, moreover, the first and/or the second membrane are fluid-tight. The first and/or the second membrane can comprise for example silicone and/or latex.

One can envisage an adhesive being arranged between the decor layer and the carrier part. The adhesive can be deposited onto a lower side of the decor layer which faces the carrier part and can be laid with the decor layer onto the carrier part or be deposited before depositing the decor layer onto the carrier part at the upper side and onto the edge of the carrier part, so that the decor layer is laid onto an adhesive layer on the upper side and on the edge of the carrier part. One can also envisage an adhesive being deposited onto the decor layer as well as onto the carrier part. The adhesive and the decor layer can be deposited onto the carrier part after or before this carrier part is arranged on the support region of the lower tool.

The upper tool and/or the lower tool can be actively coolable and/or heatable. For this, the upper tool and/or the lower tool can comprise at least one channel for leading a cooling and/or heating fluid. In embodiments, the cooling and/or heating fluid is water. One can envisage the channel being connected or connectable to a warm water connection and/or cold water connection. A particularly rapid switching between the heating and cooling can therefore be achieved, for example by way of switching over a conventional way valve.

A surface of the upper tool or lower tool can be heated for example to a temperature of at least 50° C., preferably at least 70° C. As the case may be, a surface of the upper or lower tool can be heatable for example to a temperature of at least 100° C. A surface of the upper or lower tool can additionally or alternatively be cooled for example to a temperature below 20° C., preferably to a temperature below 10° C.

On using an adhesive, in particular a hot melt adhesive, this can be firstly activated or melted by way of a heating of the surface of the upper and/or lower tool. The surface of the upper and/or lower tool can subsequently be cooled, so that a bonding effect of the adhesive sets in and/or the adhesive cures. Heat can therefore be fed to or taken from a component which comprises the carrier part and the decor layer, in a very rapid and efficient manner by way of this. By way of this, a considerable saving of time can be achieved on laminating and hence with the complete manufacturing process of the component, for example of a vehicle interior trim part. In embodiments, suitable temperatures for the heating or cooling are selected depending on the applied adhesive.

The component can be heated with the suggested laminating device in a very controlled manner in comparison to other devices which for example use a hot air blower. A danger of damage to the component due to temperatures which are too high can thus be reduced. A uniform temperature of the surface of the upper tool and/or lower tool can also be achieved with the suggested device and the corresponding method.

The slider can be translatorily and/or rotatory movable. In embodiments, the slider is translatorily movable, in order to pre-edge-fold the overhang of the decor layer around the edge of the carrier part, thus to firstly fold the overhang at least partly around the edge of the carrier part. The slider can moreover be rotationally movable, in order, preferably after the pre-edge-folding, to press the overhang onto a lower side of the carrier part in a particularly simple manner.

The laminating device can comprise a pneumatic, hydraulic or motoric device for moving the slider. In particular, the laminating device can comprise a pneumatic, hydraulic or motoric device for displacing the slider, in order to pre-edge-fold the overhang of the decor layer at least partly around the edge of the carrier part. The disclosure moreover relates to a method for laminating a decor layer onto a carrier part. The method herein comprises at least the following steps which are carried out in this or in another sequence:

A laminating device with a lower tool, a slider and an upper tool which has a pressing surface are provided. The lower tool thereby comprises a first membrane. The arrangement of this first membrane and the slider to one another and their design is such that the first membrane is movable against the slider. The laminating device is preferably a laminating device as is described above or below.

The carrier part is arranged on a support region of the lower tool. In embodiments, the carrier part is arranged on the lower tool such that it projects beyond or overhangs the support surface. A region on the lower side of the carrier part can thus be made accessible to the slider.

A decor layer is arranged on an upper side of the carrier part. Herein, a region of the decor layer projects beyond an edge of the carrier part and forms an overhang. The edge of the carrier part preferably lies in or on the region on the lower side of the carrier which is accessible to the slider.

The pressing surface is pressed onto the decor layer in a manner such that the decor layer is pressed onto the carrier part.

The first membrane is pressed against the slider in a manner such that the first membrane presses the slider against the overhang of the decor layer and edge-folds this at least party around the edge of the carrier. The decor layer is herein preferably pressed by the slider against the lower side of the carrier part. In embodiments, on edge-folding, the slider folds the overhang around an edge of the carrier part and presses the overhang of the decor layer around the edge of the carrier part and onto the lower side of the carrier. The slider however can also firstly be brought into a pre-edge-folding position, in which this slider pre-folds the overhang of the decor layer at least partly around the edge of the carrier part. Only subsequently can the membrane then press the slider against the overhang in a manner such that the overhang of the decor layer is pressed completely around the edge and/or onto the lower side of the carrier part. The suggested method can therefore comprise the following method steps: moving the slider into a pre-edge-folding position, so that the overhang of the decor layer is laid at least partly around the edge of the carrier part. Here, the slider can be moved at least partly in translatorily manner or in a purely translatory manner. This movement can be effected pneumatically, hydraulically or motorically, for example with an actuator.

The pressing of the pressing surface onto the decor layer for the pressing of said decor layer onto the upper side of the carrier part, and the pressing of the first membrane against the slider for edge-folding the overhang or the decor layer around the edge can be carried out simultaneously. The pressing pressure for pressing the pressing surface and/or for pressing the first membrane can be applied by way of an underpressure. A vacuum is preferably applied for this.

The pressing surface can be designed as a second membrane. An underpressure can be applied between the first membrane and the second membrane, so that the first membrane presses the slider against the decor layer and thus against the carrier part and the second membrane presses the decor layer on the upper side of the carrier part.

The decor layer can comprise leather, preferably real leather and/or artificial leather, for example a PU artificial leather of or a PVC artificial leather. The decor layer can also be a slush skin or textiles such as fabric or felt. In some embodiments, a thickness of the decor layer is at least 0.4 mm and/or at the most 3 mm. The decor layer can moreover be provided with a foam, e.g. PUR cut foam or PE-foam or PP-foam or also be provided with a spacer fabric. A spacer fabric can be connected to a decorative layer before an insertion into the laminating device. A spacer fabric and a decorative layer can also be inserted into the laminating device as separate layers, wherein an adhesive is deposited between the spacer fabric and the decorative layer.

The carrier part can comprise for example wood, fibre material or plastic such as PP, ABS and/or PC-ABS. The carrier part can comprise for example a natural fibre composite. Fibre-reinforced plastics, such as PP with natural fibres (NFPP) or plastics reinforced with glass fibres are particularly suitable. In some embodiments, a thickness of the carrier is at least 0.3 mm and/or at the most 3 mm, for example 0.8 or 1.2 mm.

The disclosure moreover relates to a vehicle interior trim part which was manufactured by a method which is described above.

The terms upper tool and lower tool merely serve for indicating the relative arrangement of the described components to one another. The laminating device can of course also be aligned in a manner such that for example the upper tool is arranged lower than or at the same height as the lower tool.

The features above and below which are mentioned with respect to the method can be conferred upon the laminating device and vice versa.

BRIEF DESCRIPTION OF THE DRAWINGS

The disclosure is hereinafter described by way of embodiment examples which are explained in more detail by way of the figures. There are shown in.

DETAILED DESCRIPTION

Figure 1:
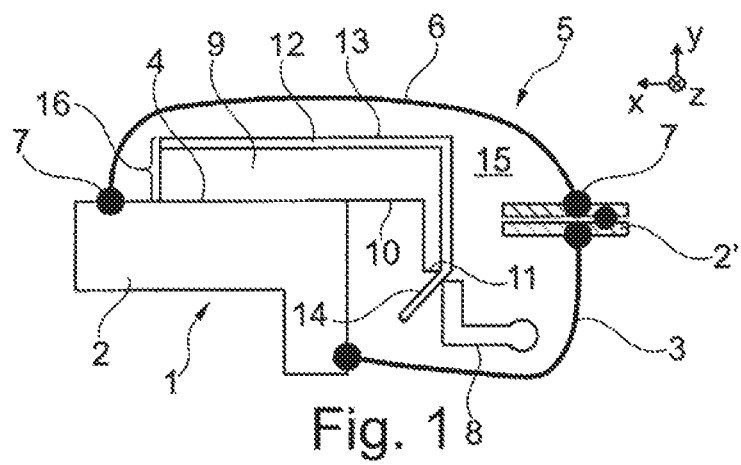
FIG. 1 a sectioned view through a schematically represented laminating device at a first point in time of a laminating and edge-folding method, according to embodiments of the disclosure.

FIG. 1 shows a laminating device in a schematic representation, according to embodiments of the disclosure. The laminating device comprises a lower tool 1 which comprises a rigid component 2 and a first membrane 3. The rigid component 2 has a support region 4 at its upper side. The rigid component 2 can be movable relative to other parts of the lower tool 1, for example relative to a frame 2'. The laminating device moreover comprises an upper tool 5 with a pressing surface 6. Of the upper tool 5, only the pressing surface 6 and the fastening points 7 of the upper tool 5 on the lower tool 1 are shown. The laminating device moreover comprises a movable slider which is translatorily movable in the x- and y-direction as well as rotationally movable about the z-axis. A carrier part 9 is arranged on the support region 4 in a manner such that the carrier part 9 projects beyond the support region 4. A lower side 10 of the carrier part 9 is therefore accessible to the slider 8. The carrier part 9 moreover comprises an edge 11 which is arranged on the lower side 10 of the carrier part 9. A decor layer 13 is moreover arranged on an upper side 12 of the carrier part 9 in a manner such that an overhang 14 of the decor layer 13 projects beyond the edge 11 of the carrier part 9. The upper tool 5 and the lower tool 1 are represented in a connected manner, thus the laminating device is represented in the closed condition. In the represented embodiment example, the pressing surface 6 is a second membrane. The first membrane 3 as well as the second membrane is extensible and airtight and of a natural or artificial material, for example of latex. The first membrane 3 is connected to the rigid component 2 in an airtight manner and the second membrane is also connected in an airtight manner to the lower tool 1 by way of fastening points 7. In embodiments, at least one of the fastening points is releasable, so that an arresting between the upper tool 5 and the lower tool 1 can be released and the laminating device opened. Each membrane is preferably fastened to a frame 2'. In some embodiments, the frames 2' are rigid and do not move with the support region 4 given a subjection to a vacuum. Hereon, the lower tool, the upper tool and the slider are enclosed by the membranes which are fastened in the frames. A space 15 between the upper tool 5 and the lower tool 1 is therefore sealed in an airtight manner and can be subjected to compressed air when the device is closed. The first membrane 3 and the second membrane can be stretched in a manner such that a distance between the pressing surface 6 and the lower tool 1, for example a distance between the first membrane 3 and the second membrane can be reduced compared to a condition, in which the space 15 is under normal pressure. This is particularly evident when comparing FIGS. 1 and 3, wherein in FIG. 1 the space 15 is under normal pressure whilst in FIG. 3 a reduced pressure in the form of a vacuum prevails in the space 15.

The decor layer 13 can be laminated onto the carrier part 9, and thus be connected to this, by way of the laminating device. A component 16, preferably a vehicle interior trim part is thus manufactured. An adhesive, for example a hot-melt adhesive or a polyurethane adhesive is arranged between the carrier part 9 and the decor layer 13, for connecting the decor layer 13 to the carrier part 9. The adhesive can be deposited onto an upper side and edge, in particular onto the inner side 18 of the edge, before the insertion of the carrier part 9 into the laminating device or not until the carrier part 9 is already arranged on the support region 4. Of course, the adhesive can also be deposited onto a lower side of the decor layer 13. The decor layer 13 with or without adhesive can be arranged on the carrier part 9 before or after laying the carrier part 9 onto the support region 4, in the manner described above. The adhesive for example can be sprayed on or rolled on.

The decor layer 13 is a real leather skin. The decor layer 13 can of course also be an artificial leather skin, a textile layer, a foil or a different type of edge-foldable layer, for example a thin metal foil. One also envisages the decor layer 13 consisting of different parts which are connected to one another, for example sewn to one another. Here, the decor layer 13 can comprise materials which are connected to one another, said materials being the same or different. In embodiments, an upper side of the decor layer 13 is a viewed side of the finished manufactured component, here of the vehicle interior trim part. In the shown example, a thickness of the decor layer 13 is 1 mm. The carrier part 9 comprises wood, fibre material or plastic and in the shown example is an NFPP composite material of natural fibres and polypropylene. In further embodiments, the carrier part 9 can of course comprise other materials.

Figure 2:
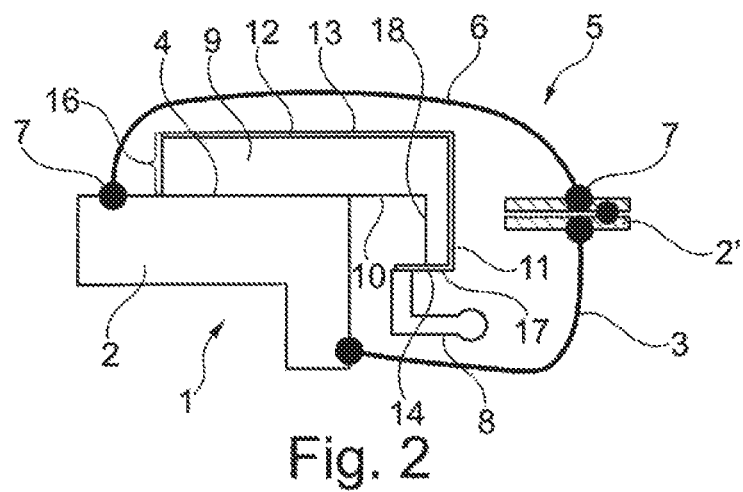
FIG. 2 a sectioned view through the schematically represented laminating device at a second point in time of the laminating and edge-folding method, according to embodiments of the disclosure.

In FIG. 1, the slider 8 is shown at the beginning of a pre-edge-folding movement. The slider is moved in the x-direction against the overhang 14 and herein folds the overhang 14 partly around the edge 11 of the carrier part 9. The slider 9 is shown at a later point in time during the pre-edge-folding movement in FIG. 2 and is displaced further in the x-direction compared to the representation in FIG. 1. The overhang 14 is folded around the edge 11 by an angle of 90° by way of this slider movement and bears on the lower side 17 of the edge 11. The pre-edge-folding movement of the slider 8 is completed with this.

Figure 3:
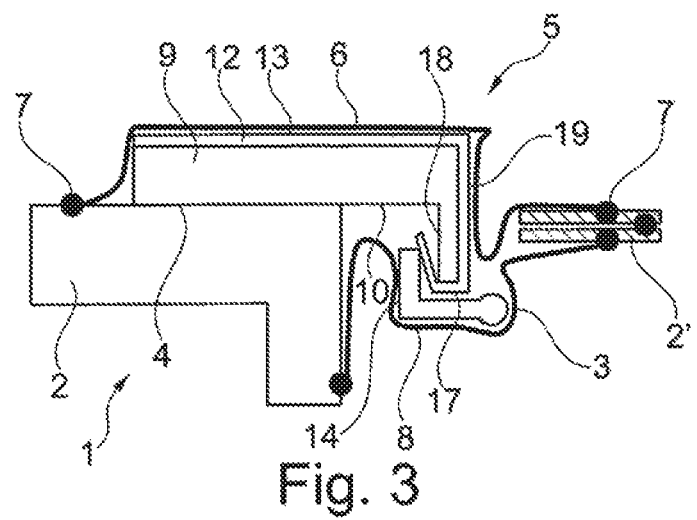
FIG. 3 a sectioned view through the schematically represented laminating device at a third point in time of the laminating and edge-folding method, according to embodiments of the disclosure.

The space 15 of the laminating device is subjected to a reduced pressure in FIG. 3. The first membrane 3 pushes the slider 8 against the pre-edge-folded overhang 14 of the decor layer 13 upon subjecting the space 15 to a vacuum. Herein, the overhang 14 of the decor layer 13 is edge-folded around the edge 11, which is to say is folded about the edge 11 and is pressed onto the carrier part. In FIG. 3, the slider is shown at a point in time, at which the edge-folding process is not yet fully completed, which can be recognised by the fact that the overhang 14 of the decor layer 13 does not yet bear on the inner side 18 of the edge 11. The edge-folding process is therefore not completed until the slider 8 has pressed the overhang 14 completely against the inner side 18 of the edge 11 of the carrier part 11 by way of the pressing pressure exerted by the first membrane 3. Herein, the slider 8 can be moved rotationally about the axis z or translatorily in the x- and y-direction from the first membrane 3.

FIG. 3 further shows the second membrane which likewise presses against the decor layer 13 by way of subjecting the space 15 to the vacuum. However, the second membrane pushes the decor layer 13 onto the upper side 12 of the carrier part 9 and in the shown example additionally partly onto a side 19 of the carrier part 9. The decor layer 13 is laminated onto the carrier part 9 by way of the second membrane.

The surface of the upper tool or lower tool 5,1 is heated to a temperature for example of 80° C., in order to activate or melt the adhesive between the decor layer and the carrier part. This can be realised for example by way of fluid conduits (not shown in FIGS. 1 to 3), for example pipes. These are connected onto a hot water connection and a cold water connection. On heating, for example water or oil with a temperature of 90° C. or above 100° C. is led through the pipes. The heat of the water or oil is transmitted through the upper tool and lower tool in the direction of the decor layer 13, so that the adhesive can be activated or melted. After the heating, cold water, for example at a temperature of 5° C. can be led through the pipes instead of hot water, by way of reversing the way valve, so that the surfaces of the upper tool 5 and/or of the lower tool 1 can be cooled and the adhesive be cure.

FIGS. 4 to 7 show further embodiments of a laminating device. Recurring features are provided with the same reference numerals.

Figure 4:
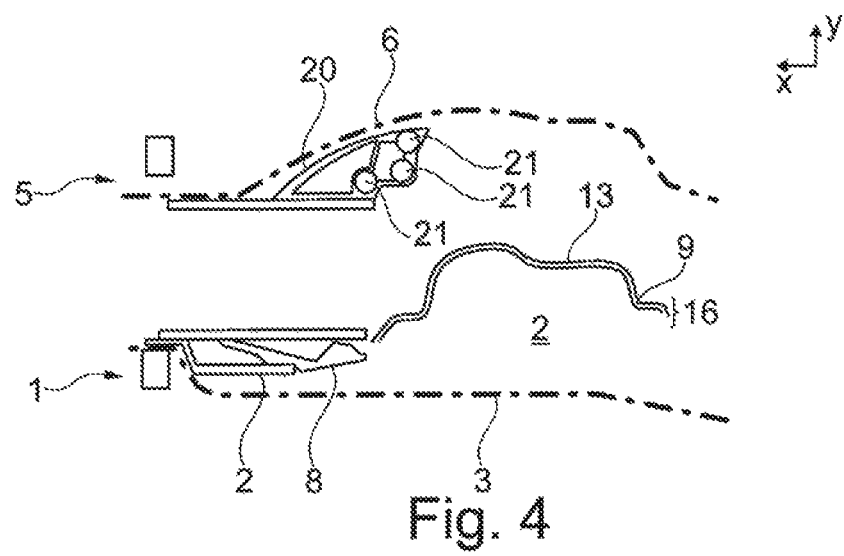
FIG. 4 a sectioned view of a further schematically represented laminating device in an opened position, according to embodiments of the disclosure.
Figure 5:
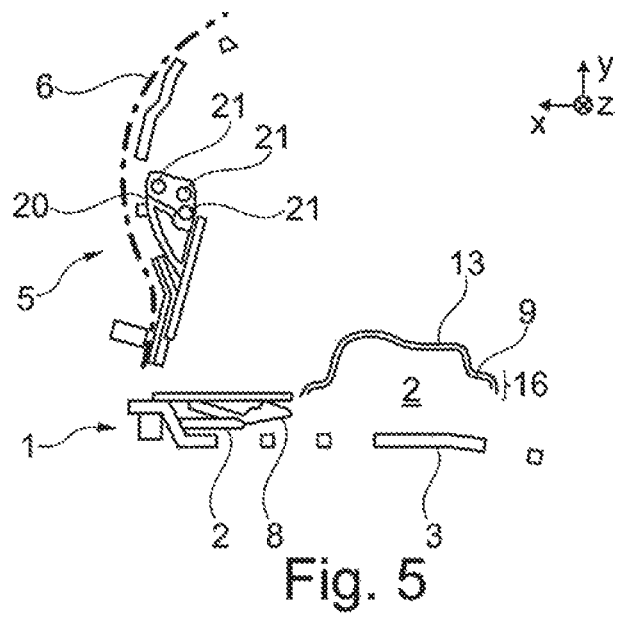
FIG. 5 a sectioned view of a further schematically represented laminating device in the folded open position, according to embodiments of the disclosure.
Figure 6:
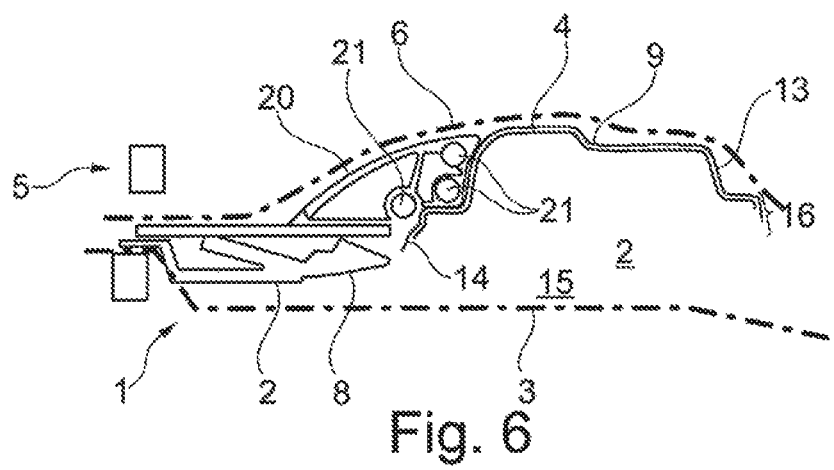
FIG. 6 a sectioned view of the further schematically represented laminating device in the closed position, according to embodiments of the disclosure.
Figure 7:
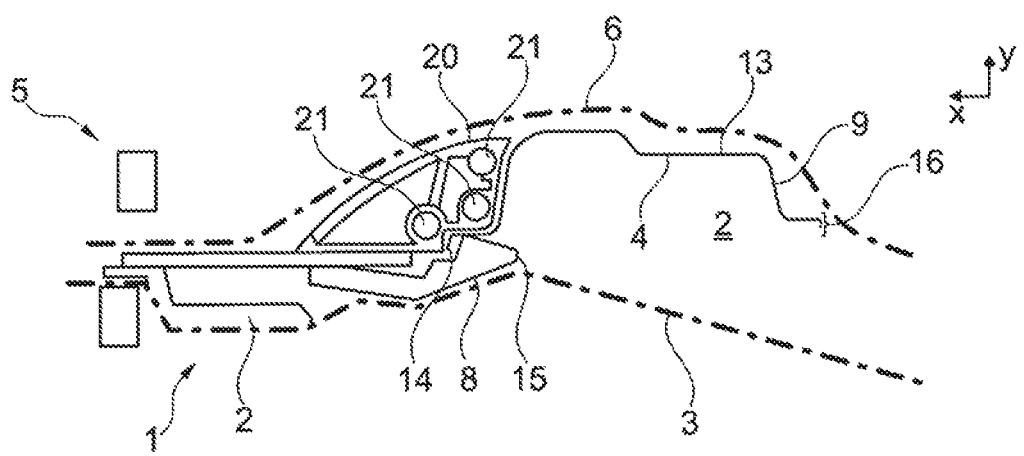
FIG. 7 a sectioned view of the further schematically represented laminating device in the closed position with an extended slider, according to embodiments of the disclosure.

All four FIGS. 4 to 7 shows the upper tool 5 and the lower tool 1 with the rigid component 2. Moreover, the slider 8 which serves for edge-folding the overhang 14 of the decor layer 13 around the edge of the carrier part 9 is represented in all three figures. As already described, the slider 8 herein edge-folds the overhang 14 by way of it pressing against the overhang 14 of the decor layer 13, so that the overhang 14 is pressed around the edge of the carrier part 9 onto a lower side of the carrier part 9. As is shown in FIG. 4, the laminating device can comprise a translatory opening mechanism, concerning which the upper tool 5 is movable in the y-direction. As is shown in FIG. 5, the laminating device can additionally or alternatively have a rotatory opening mechanism, concerning which the upper tool 5 can be tilted about a z-axis, in order to open the laminating device. The laminating device is represented in FIGS. 4 and 5 in an opened manner, wherein FIGS. 6 and 7 show the laminating device in a closed condition. In the opened condition, the component 16 is laid into the laminating device. The component 16 comprises the decor layer 13, the adhesive and the carrier part 9, wherein the adhesive is not yet activated and the decor layer 13 and the carrier part 9 are therefore not yet fixedly connected to one another. The lower tool 1 comprises the first membrane 3 and the upper tool 5 the second membrane as a pressing surface 6. The membranes are of latex and are connected to the upper tool 5 and lower tool 1, respectively, in a fluid-tight manner. The space 15 between the upper tool 5 and the lower tool 1 is sealed in a fluid-tight manner in the closed condition of the laminating device.

The upper tool 5 moreover comprises an insert 20. The insert 20 in turn comprises three pipes 21 which are connected to a warm water connection and cold water connection and is heatable or coolable by way of this. The outer shape of the insert 20 is moreover formed by an aluminium frame which is adapted to a concave shape of the carrier part 9. The aluminium frame thus leads heat or cold onto the component 16 via a surface of the insert. The pressing surface 6, here the second membrane, presses the insert 20 against the decor layer 13 and therefore against the carrier part 9. Even a complex concave region can therefore be laminated given an adequately uniform surface pressing. As already explained above in more detail, the adhesive can be activated by way of heating the insert and the adhesive can be cured by way of it being cooled.

A momentary picture during an edge-folding process and laminating process is represented in FIG. 7. The space 15 is subjected to a vacuum, so that the second membrane to some extent presses upon the insert 20 and this upon the decor layer 13 at the upper side of the carrier part 9 and to a further extent directly upon the decor layer 13 and therefore presses the decor layer 13 onto the carrier part. The slider 8 is moreover pressed against the overhang 14 so that the slider 8 edge-folds the overhang 14 around the edge of the carrier. The slider 8 is of metal and is mounted in a guide rail.

We claim:

1. A laminating device for laminating a decor layer onto a carrier part, comprising:
    a lower tool with a support region for receiving the carrier part;
    an upper tool comprising a pressing surface for exerting a pressing pressure onto the decor layer which is arranged between an upper side of the carrier part and the pressing surface; and
    at least one movable slider for edge-folding an overhang of the decor layer around an edge of the carrier part by way of pressing the slider against the overhang of the decor layer, so that the overhang is pressed around the edge of the carrier part onto a lower side of the carrier part,
    wherein the upper tool and lower tool are configured such that a distance between the lower tool and the pressing surface can be enlarged or reduced, and
    wherein the lower tool comprises a first membrane, wherein an arrangement of the first membrane and the slider to one another is such that the first membrane is movable onto the slider, for pressing the slider against the overhang of the decor layer.

2. A laminating device according to claim 1, wherein the first membrane is movable against the slider by way of producing an underpressure.

3. A laminating device according to claim 1, wherein the pressing surface is a second membrane.

4. A laminating device according to claim 3, wherein a space between the first membrane and the second membrane can be sealed off in a fluid-tight manner, so that the second membrane can be pressed against the decor layer which is arranged on the upper side of the carrier part and the first membrane against the slider, by way of subjecting the space to an underpressure.

5. A laminating device according to claim 1, wherein at least one of the upper tool and the lower tool is at least one of actively coolable and heatable.

6. A laminating device according to claim 1, wherein the slider is translatorily and rotationally movable.

7. A laminating device according to claim 1, including at least one of a pneumatic, hydraulic, and motoric device for moving the slider.

* * * * *